(12) United States Patent
Yamamoto

(10) Patent No.: US 6,561,050 B2
(45) Date of Patent: May 13, 2003

(54) SHIFT-ASSISTING DEVICE FOR A TRANSMISSION

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/847,407

(22) Filed: May 3, 2001

(65) Prior Publication Data
US 2001/0042415 A1 Nov. 22, 2001

(30) Foreign Application Priority Data
May 19, 2000 (JP) ........................ 2000-148173

(51) Int. Cl.⁷ .................. F16H 59/00; F16H 61/00; F16H 63/00
(52) U.S. Cl. .................. 74/335; 74/336 R; 74/388 R; 74/473.12
(58) Field of Search ............. 74/335, 336 R, 74/337, 339, 388, 473.12, 473.13, 473.1; 477/97, 80; 701/53, 55, 64

(56) References Cited

U.S. PATENT DOCUMENTS

| 4,693,129 A | * | 9/1987 | Pierce ....................... 74/333 |
| 4,849,888 A | * | 7/1989 | Seto .......................... 701/51 |
| 4,911,031 A | * | 3/1990 | Yoshimura et al. ........... 74/335 |
| 5,012,699 A | * | 5/1991 | Aoki et al. ................. 477/143 |
| 5,957,806 A | * | 9/1999 | Hirose et al. .............. 192/3.58 |
| 5,979,258 A | * | 11/1999 | Nakano ..................... 74/336 R |

OTHER PUBLICATIONS

Yamamoto US Publication 2002/0053248 filed on Oct. 2001.*

* cited by examiner

Primary Examiner—Sherry Estremsky
Assistant Examiner—Tisha D. Lewis
(74) Attorney, Agent, or Firm—Antonelli, Terry, Stout & Kraus, LLP

(57) ABSTRACT

A shift-assisting device for a transmission includes a controller for outputting, to an electric motor for shift-assisting, a signal of a driving force corresponding to a shift stroke position. The controller outputs, to the electric motor, a signal of a driving force smaller than the driving force corresponding to the shift stroke position when the difference in the synchronized rotational speed is smaller than a predetermined rotational speed.

3 Claims, 5 Drawing Sheets

SHIFT-ASSISTING DEVICE FOR A TRANSMISSION

FIELD OF THE INVENTION

The present invention relates to a shift-assisting device for reducing the shifting force in the speed-change operation of a transmission mounted on a vehicle.

DESCRIPTION OF THE PRIOR ART

Large trucks and buses that require a large shifting force for changing the speed have been equipped with a shift-assisting device for executing the shifting operation with a decreased force. The shift-assisting device with which large vehicles are furnisheduses generally compressed air as the source of operation. The shift-assisting device that uses compressed air as the source of operation is equipped with a shift actuator comprising a pneumatic pressure cylinder that operates a speed-change operation mechanism coupled to a change lever in the same direction as the direction in which the change lever is shifted. Large vehicles generally use compressed air as the source for operating the brake and are, hence, able to use the compressed air for the shift-assisting device. However, small- and medium-sized vehicles that are not equipped with a compressor as a source of compressed air cannot be provided with a shift-assisting device that uses a shift actuator that comprises a pneumatic pressure cylinder. In recent years, however, it has been demanded to provide even small- and medium-sized vehicles with a shift-assisting device, and there have been proposed shift-assisting devices using an electric motor as disclosed in, for example, Japanese Laid-open Patent Publication (Kokai) No. 8737/1993 and Japanese Patent No. 2987121. In a shift-assisting device using an electric motor, it is desired to control the driving force of the electric motor in response to the operation of the change lever by a driver in order to conduct a smooth shifting operation. According to the shift-assisting devices disclosed in the above Japanese Laid-open Patent Publication (Kokai) No. 87237/1993 and Japanese Patent No. 2987121, the force for operating the change lever toward the direction of shift is detected, and the driving force of the electric motor is controlled according to this force of operation.

In shifting a transmission equipped with a synchronizing mechanism, the largest operation force is required for bringing the gears into engagement with a synchronized mechanism and then, a considerably large operation force is required for bringing the chamfer of the dog teeth into engagement with the chamfer for the spline of the clutch sleeve. And, in disengaging the gears, an operation force is required from the start of operation for disengaging the gears until the dog teeth are disengaged from the spline of the clutch sleeve. However, in the shift-assisting device that controls the driving force of the electric motor based on the operation force, since the electric motor is driven after the operation force has reached a predetermined value, there exists a time lag until the assisting force is produced after the operation force has increased, In executing the shifting operation, therefore, the driver feels a large force just before the assisting force is produced by the electric motor. In order to solve this problem, the present applicant has proposed in Japanese Patent Application No. 46173/2000 a shift-assisting device for a transmission which has a shift stroke sensor that detects the shift stroke position of the shifting mechanism and controls the electric motor for shift-assisting, based on a detection signal from the shift stroke sensor, so as to obtain a driving force corresponding to the shift stroke position.

In a shift-assisting device that controls an electric motor for shift-assisting to obtain a driving force corresponding to the shift stroke position, however, the electric motor is set to produce the largest assisting force when the shift stroke is positioned in the synchronizing range. It has been found that due to this, the clutch sleeve is caused to move at a high speed just after termination of the synchronization, and as a result, a phenomenon in which the clutch sleeve hits the stroke end at a high speed occurs.

SUMMARY OF THE INVENTION

It is an object of the present invention to provide a shift-assisting device for a transmission, which is capable of preventing the occurrence of the above phenomenon of the clutch sleeve in the shifting operation.

In order to accomplish the above-mentioned object, the present invention provides a shift-assisting device for a transmission comprising an electric motor for operating a speed-change operation mechanism in the same direction as the direction in which a change lever is shifted, the speed-change operation mechanism being coupled to the change lever and actuating a synchronizing mechanism of the transmission; a shift stroke sensor for detecting the shift stroke position of the speed-change operation mechanism; and a controller for outputting, to the electric motor, a signal indicative of a driving force corresponding to the shift stroke position in response to a detection signal from the shift stroke sensor;

wherein the controller comprises a gear position judging means for judging a target gear position of the transmission that is to be shifted by the change lever, and a difference-in-the-synchronized-rotational-speed detector means for detecting a difference in the synchronized rotational speed of the target gear position judged by the gear position judging means; and when the difference in the synchronized rotational speed detected by the difference-in-the-synchronized-rotational-speed detector means is smaller than a predetermined rotational speed, the controller outputs, to the electric motor a signal indicative of a driving force smaller than the driving force that corresponds to the shift stroke position.

According to the present invention, there is further provided a shift-assisting device for a transmission, which comprises a selected position sensor for detecting the selected position of the speed-change operation mechanism and a shifting direction detector means for producing signals corresponding to the operations in a first shifting direction and in a second shifting direction of the change lever, and in which the gear position judging means judges a target gear position of the transmission, that is to be shifted by the change lever based on the selected position detected by the selected position sensor and the shifting direction detected by the shifting direction detector means.

According to the present invention, there is further provided a shift-assisting device for a transmission, which comprises an input-shaft-rotational-speed sensor for detecting the rotational speed of the input shaft of the transmission; and an output-shaft-rotational-speed sensor for detecting the rotational speed of the output shaft of the transmission; and in which the difference-in-the-synchronized-rotational-speed detector means determines the rotational speed of a speed change gear of the target gear position judged by the gear position judging means based on the target gear position judged by the gear position judging means and the rotational speed of the input shaft detected by the input-shaft-rotational-speed sensor, and obtains a difference in the synchronized rotational speed by comparing the rotational speed of the speed change gear with the rotational speed of the output shaft detected by the output-shaft-rotational-speed sensor.

DETAILED DESCRIPTION OF THE PREFERRED EMBODIMENT

A preferred embodiment of the shift-assisting device for a transmission, constituted according to the present invention will now be described in further detail with reference to the accompanying drawings.

Figure 1:
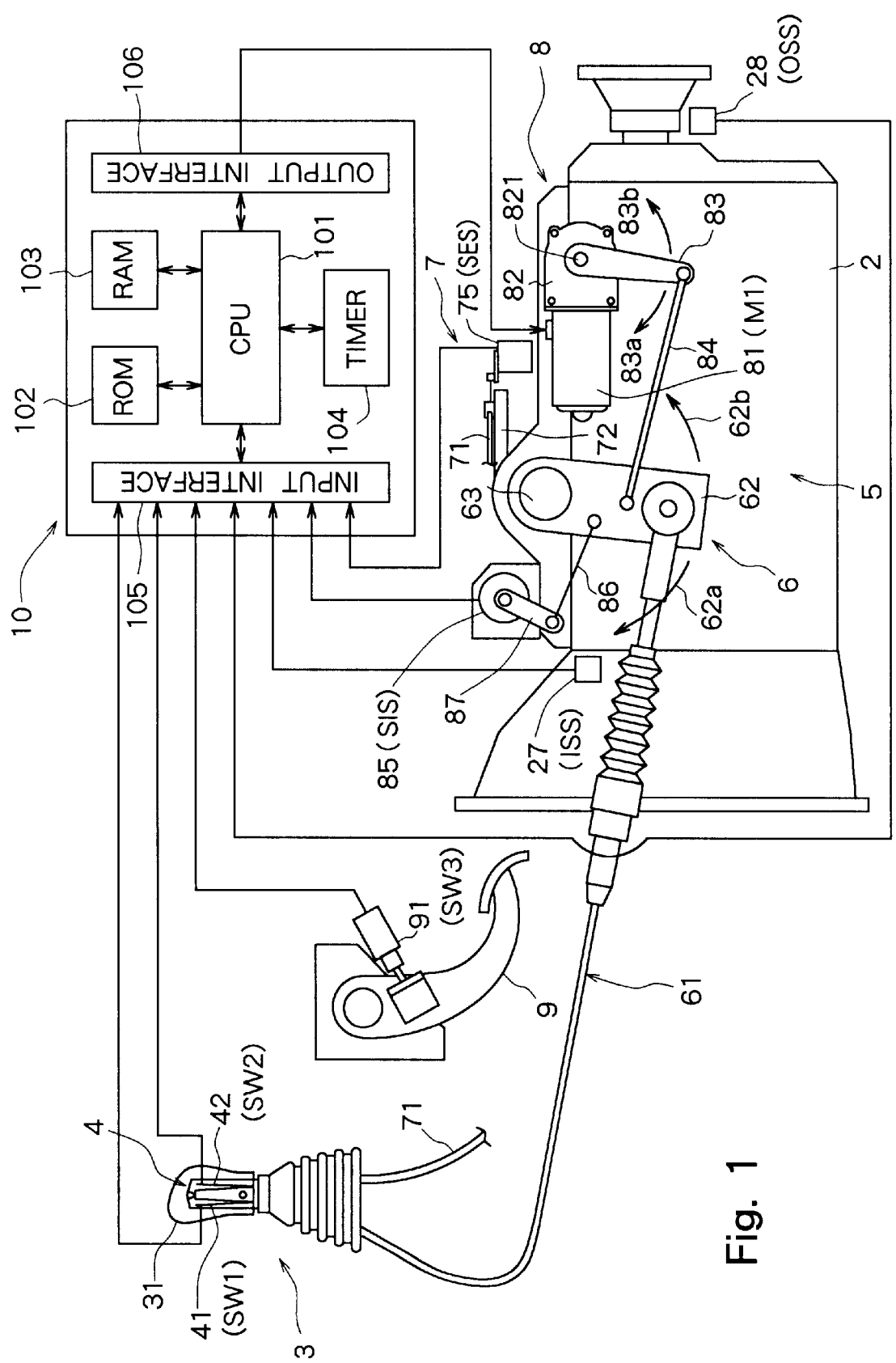
FIG. 1 is a diagram schematically illustrating the constitution of a speed-changing mechanism equipped with a shift-assisting device in a transmission, constituted according to the present invention.

FIG. 1 is a diagram schematically illustrating the constitution of a speed-changing mechanism equipped with a shift-assisting device for a transmission constituted according to the present invention.

The speed-changing mechanism shown in FIG. 1 comprises a change lever 3 for changing the speed of a transmission 2 equipped with a synchronizing mechanism, a speed-change operation mechanism 5 coupled to the change lever 3, and a shift-assisting device 9 for operating the speed-change operation mechanism 5 in the same direction as the direction in which the change lever 3 is shifted.

Figure 2:
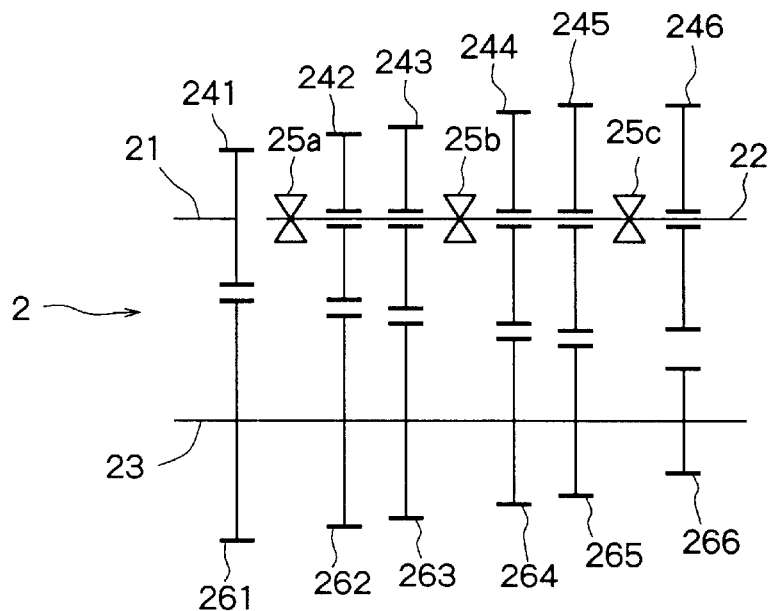
FIG. 2 is a diagram schematically illustrating the constitution of a gear mechanism in the transmission of FIG. 1.

Referring to FIG. 2, the transmission 2 comprises a gear mechanism of five forward speeds and one reverse speed. The transmission 2 has an input shaft 21, an output shaft 22 disposed on the same axis as that of the input shaft 21, and a counter shaft 23 arranged in parallel with the output shaft 22. On the input shaft 21 is mounted a drive gear 241 (a fifth speed gear in the illustrated embodiment), and on the output shaft 22 are rotatably mounted a fourth speed gear 252, a third speed gear 243, a second speed gear 244, a first speed gear 245 and a reverse gear 246. On the output shaft 22 are further disposed synchronizing mechanisms 25a, 25b and 25c between the fifth speed gear 241 and the fourth speed gear 242, between the third speed gear 243 and the second speed gear 244, and between the first speed gear 245 and the reverse gear 246, respectively. On the counter shaft 23, there are arranged counter gears 261, 262, 263, 264 and 265 that are in mesh with the fifth speed gear 241, fourth speed gear 242, third speed gear 243, second speed gear 244 and first speed gear 245 at all times, and a counter gear 266 that is in mesh with the reverse gear 246 via an idling gear that is not shown.

Figure 3:
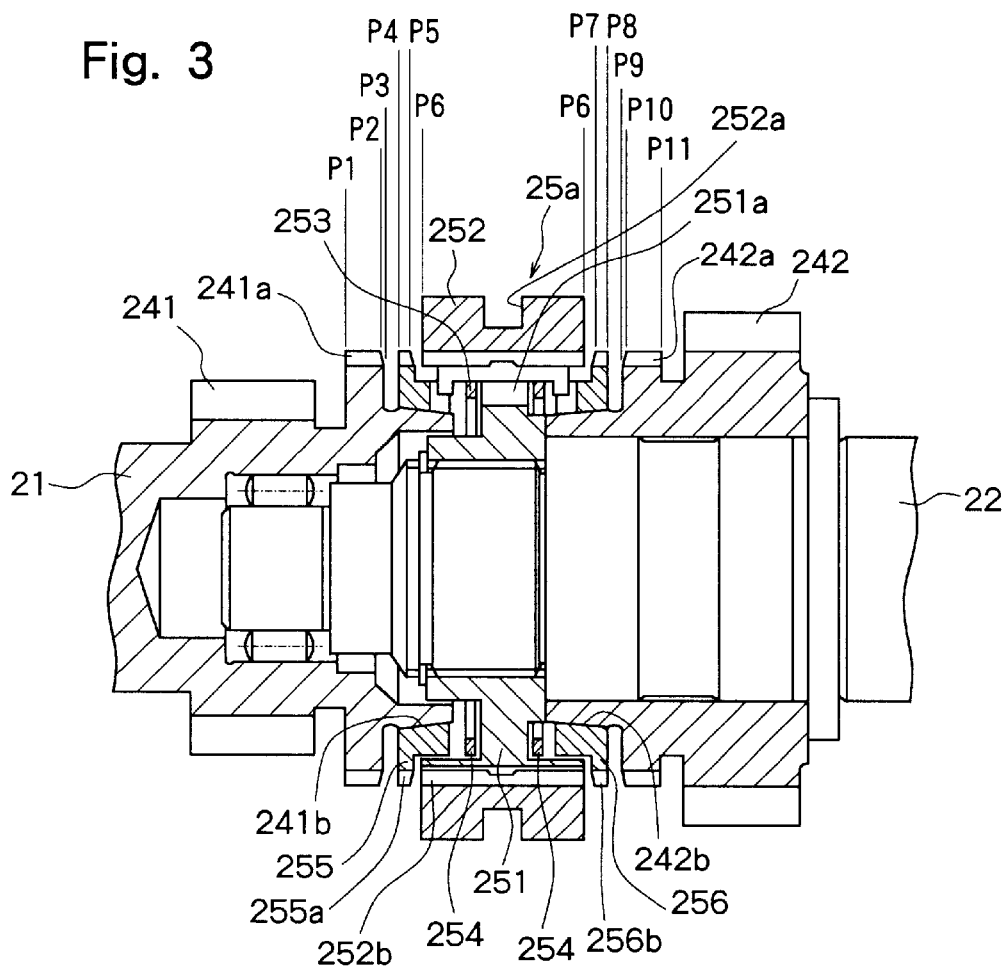
FIG. 3 is a sectional view of a synchronizing mechanism with which the transmission of FIG. 1 is provided.

Next, the synchronizing mechanism 25a, 25b and 25c will be described with reference to FIG. 3. The illustrated synchronizing mechanism 25a, 25b and 25c are all constituted substantially in the same manner. Therefore, described below is only the synchronizing mechanism 25a that is disposed between the fifth speed gear 241 and the fourth speed gear 242.

The illustrating synchronized mechanism 25a is a known key-type synchronizing mechanism which comprises a clutch hub 251 mounted on the output shaft 22, a clutch sleeve 252 slidably fitted to an external gear spline formed on the outer circumference of the clutch hub 251, keys 253 arranged in plural (e.g., three) key grooves 251a formed in the clutch hub 251 in the radial direction thereof, key springs 254, 254 arranged on the inner sides at both ends of the keys 253 to push the keys 253 toward the clutch sleeve 252, dog teeth 241a and 242a formed on the fifth speed gear 241 and on the fourth speed gear 242, and synchronizer rings 255 and 256 disposed on the conical surfaces 241b and 242b formed on the fifth speed gear 241 and on the fourth speed gear 242. The thus constituted synchronizing mechanism 25a has a shift fork fitted into an annular groove 252a formed in the outer circumference of the clutch sleeve 252, the shift fork being mounted on a shift rod of a shifting mechanism constituting the speed-change operation mechanism 5 that will be described later. The clutch sleeve 252 is slid by the above shift fork toward either the right or the left in the drawing, whereby the spline 252b of the clutch sleeve 252 is brought into mesh with the teeth of the synchronizer ring 255 and dog teeth 241a or with the synchronizer ring 256 and dog teeth 242a. The illustrated synchronizing mechanism has been constituted in a known manner and hence, is into described here in further detail.

Figure 4:
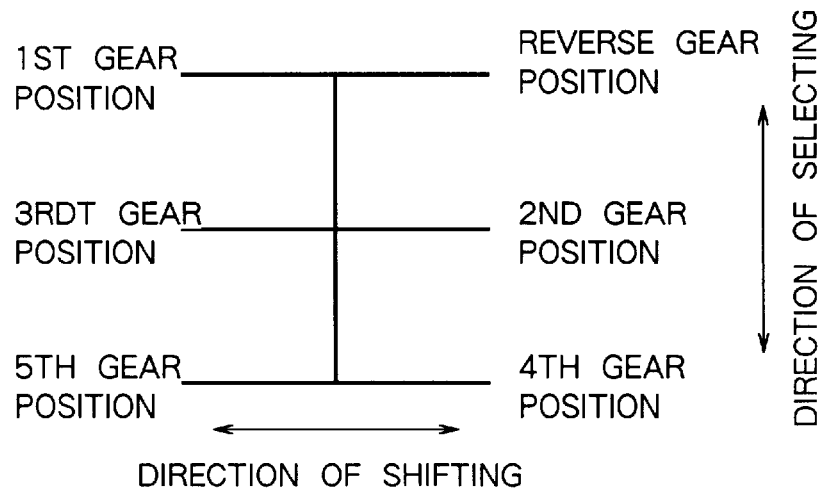
FIG. 4 is a diagram illustrating a shifting pattern of a change lever in the speed-changing mechanism shown in FIG. 1.

The above-mentioned synchronizing mechanisms 25a, 25b and 25c are operated by the change lever 3 and by the speed-change operation mechanism 5 connected to the change lever 3. The change lever 3 is so constituted that it can be tilted in a direction (direction of selection) perpendicular to the surface of the paper in FIG. 1 and in the right-and-left direction (direction of shift) with a shaft that is not shown, as a center. In order to operate the synchronizing mechanism 25a, 25b and 25c, the change lever 3 is operated along a speed-change pattern shown in FIG. 4. A shift knob switch 4 is provided in a knob 31 of the change lever 3. The shift knob switch 4 includes a first switch 41 (SW1) and a second switch 42 (SW2) for detecting the direction of operation when the knob 31 of the change lever 3 is tilted in the direction of shift. The shift knob switch 4 is, for example, so constituted that the first switch 41 (SW1)is turned on when the knob 31 of the change lever 3 is tilted toward the left in FIG. 1 and that the second switch 42 (SW2) is turned on when the change lever 3 is tilted toward the right in FIG. 1. The shift knob switch 4 is further so constituted that both the first switch 41 (SW1) and the second switch (SW2) are turned off when the driver separates his hand away from the knob 31 of the change lever 3, and the on and off signals are sent to a controller that will be described later. The above shift knob switch pertains to a known technology as disclosed in, for example, Japanese Laid-open Utility Model Publication (Kokai) No. 97133/1981 and hence, is not described here in further detail.

Figure 5:
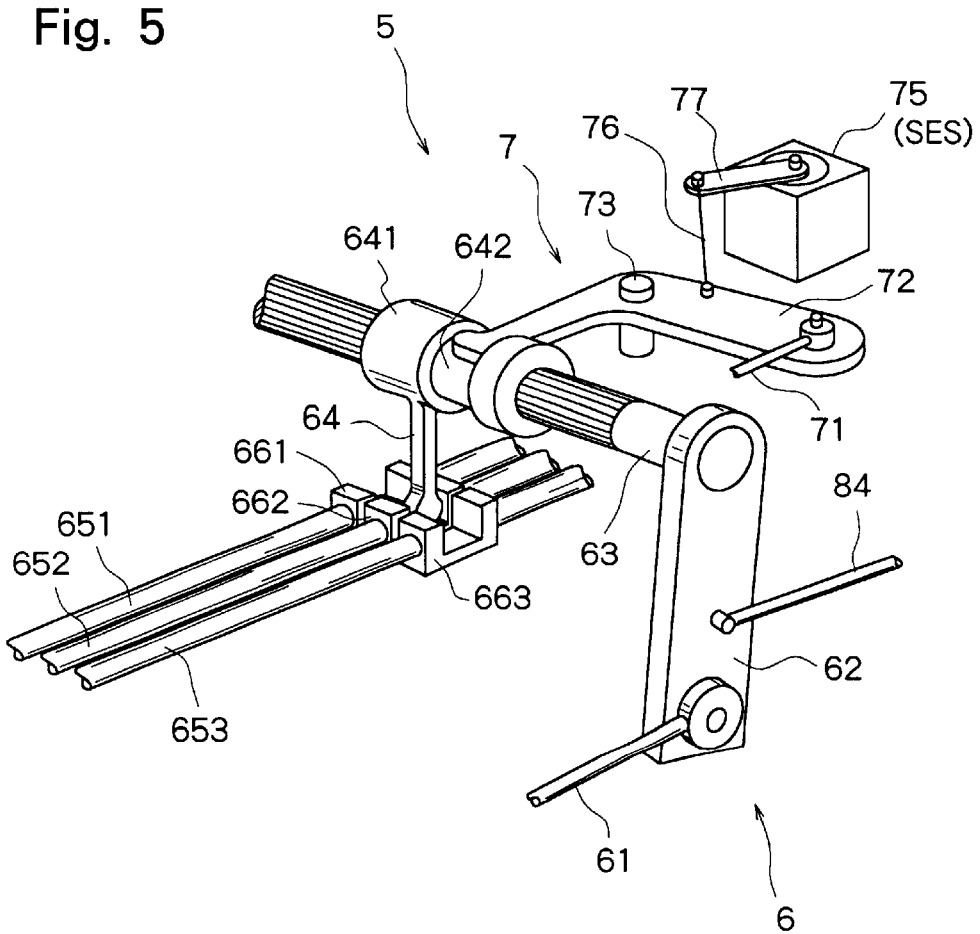
FIG. 5 is a perspective view illustrating major portions of a shifting mechanism constituting the speed-changing mechanism shown in FIG. 1.

Next, described below with reference to FIGS. 1 and 5 is the speed-change operation mechanism 5 that is coupled to the change lever 3 for operating the synchronizing mechanisms 25a, 25b and 25c.

The speed-change operation mechanism 51 is constituted by a shifting mechanism 6 and a selecting mechanism 7. The shifting mechanism 6 comprises a push-pull cable 61 which is connected at its one end to the change lever 3, a control lever 62 that is connected at its one end to the other end of the push-pull cable 61, a control rod 63 that is connected to the other end of the control lever 62 and is rotatably supported by a case cover (not shown) of the transmission 2, and a shift lever 64 fitted to the control rod 63 by a spline so as to slide in the axial direction. The shift lever 64 selectively engages at its end portion with a shift block 661, 662 or 663 mounted on the shift rods 651, 652 and 653. Shift forks (not shown) are mounted on the shift rods 651, 652, and 653, and engage with the annular grooves formed in the outer circumferences of the clutch sleeves of the synchronizing mechanisms 25a, 25b and 25c. A known interlocking mechanism is disposed among the shift rods 651, 652 and 653, so that the two shift rods will not be simultaneously operated. The shifting mechanism 6 is constituted in a known manner and hence, is not described here in detail.

The shift lever 64 is slid in the axial direction by the selecting mechanism 7 and is brought to a predetermined selected position. The selecting mechanism 7 includes a push-pull cable 71 connected at its one end to the change lever 3, and a selecting lever 72 that is connected at its one end to the other end of the push-pull cable 71 and is rotatably supported at its central portion to pivot on a support shaft 73, the other end of the selecting lever 72 being engaged with a fitting groove 642 formed in the outer peripheral surface of a mounting boss portion 641 of the shift lever 64. By operating the change lever 3 in the direction of selection, therefore, the shift lever 64 is slid on the control rod 63 in the axial direction via the push-pull cable 71 and the selecting lever 72. The other end of the shift lever 64 is brought into engagement with the shift block 661, 662 or 663, selectively. The selecting mechanism 7 is constituted in a known manner and hence, is not described here in detail.

The selecting mechanism 7 in the illustrated embodiment is equipped with a selected position sensor 75 (SES) for detecting the position of the shift lever 64 in the direction of selection. The selected position sensor 75 (SES) is coupled to the selecting lever 72 through a rod 76 and a lever 77, is constituted by a potentiometer that detects the position of the shift lever 64 in the direction of selection according to the operation angle of the selecting lever 7, and sends a detection signal to the controller 10.

In the illustrated embodiment, the shift-assisting device 8 operates the above-mentioned shifting mechanism 6 in the same direction as the direction in which the change lever 3 is shifted. The shift-assisting device 8 is equipped with an electric motor 81 (M1) that can be rotatively driven forward and reverse as a source of driving force. A reduction gear 82 is coupled to the electric motor 81 (M1), and an end of an operation lever 83 is mounted on a output shaft 821 of the reduction gear 82. The other end of the operation lever 82 is coupled to the control lever 62 via a coupling rod 84. When the electric motor 81 (M1) is driven to rotate forward, the thus constituted shift-assisting device 8 actuates the operation lever 83 in a direction indicated by an arrow 83a, and moves the control lever 62 via the coupling rod 84 in a direction indicated by an arrow 62a to assist the shifting operation. When the electric motor 81 (M1) is driven to rotate reversely, on the other hand, the shift-assisting device 8 actuates the operation lever 83 in a direction indicated by an arrow 83b, and moves the control lever 61 via the coupling rod 84 in a direction indicated by an arrow 62b to assist the shifting operation.

The shift-assisting device 8 in the illustrated embodiment has a shift stroke sensor 85 (SIS) for detecting the shift stroke position of the shift mechanism 6. The shift stroke sensor 85 (SIS) is connected to the control lever 61 via a rod 86 and a lever 87, is constituted by potentiometer that detects the shift stroke position depending upon the angle of operation of the control lever 62, and sends a detection signal to the controller 10.

The controller 10 is constituted by a microcomputer which comprises a central processing unit (PU) 101 for executing the operation according to a control program, a read-only memory (ROM) 102 for storing the control program, a map for controlling the speed of connecting the clutch and gear ratio of the speed-change gear of the transmission 2 that will be described later, a read/write random access memory (RAM) 103 for storing the results of operation, a timer (T) 104, an input interface 105 and an output interface 106. The input interface 105 of the thus constituted controller 10 receives signals detected by the first switch 41 (SW1) and the second switch 41 (SW2) constituting the shift knob switch 4 and signals detected by the selected position sensor 75 (SES) and the shift stroke sensor 85 (SIS). The input interface 105 further receives a signal detected by a clutch pedal switch 91 (SW3) which detects the operation state of a clutch pedal 9 for operating the clutch disposed between the engine that is not shown and the transmission 2. The clutch pedal switch 91 (SW3) is turned off in a state where the clutch pedal 9 is released, i.e., where the clutch pedal 9 is not depressed (clutch is connected), and produces a signal ON when the clutch pedal 9 is depressed to disconnect the clutch. When an automatic clutch is mounted to automatically disconnect or connect the clutch based on the signals from the shift knob switch 4 and from the shift strike sensor 85 (SIS), the input interface 105 receives a signal detected by a clutch stroke sensor that detects the amount of engagement of the clutch instead of the clutch pedal 9. The input interface 105 further receives signals from an input-shaft-rotational-speed sensor 27 (ISS) that detects the rotational speed of the input shaft 21 of the transmission 2 and from an output-shaft-rotational-speed sensor 28 (OSS) that detects the rotational speed of the output shaft 22. The output interface 106 sends control signals to the electric motor 81 (M1) and the like.

The above-mentioned controller 10 has a function of a gear position judging means for judging a target gear position of the transmission 2, that is to be shifted by the change lever 3, and a function of a difference-in-the-synchronized-speed detector means for detecting a difference in the synchronized speed of the target gear position that has been judged. The gear position judging means judges the target gear of the transmission 2, that is to be shifted by the change lever 3, based on a selected position signal detected by the selected position sensor 75 (SES) and on shift direction signals from the first switch 41 (SW1) and the second switch 42 (SW2) constituting the shift knob switch 4 that produces signals corresponding to the operations in the first shifting direction and in the second shifting direction of the change lever 3. The difference-in-the-synchronized-speed detector means determines the rotational speed (NA) of the speed change gear of the target gear position judged by the gear position judging means based on the target gear position judged by the above gear position judging means and the rotational speed of the input shaft detected by the input-shaft-rotational-speed sensor 27 (ISS). That is, the rotational speed (NA) of the speed change gear of the target gear position judged by the gear position judging means can be obtained by reading a gear ratio of the target gear position judged by the gear position judging means from the read-only memory (ROM) 102, and by multiplying this gear ratio by a rotational speed (Nin) of the input shaft detected by the input-shaft-rotational-speed sensor 27 (ISS). The obtained value of the rotational speed (NA) of the speed change gear of the target gear position judged by the gear position judging means is then compared with the rotational speed (Nout) of the output shaft detected by the output-shaft-rotational-speed sensor 28 (OSS), i.e., the rotational speed of the clutch sleeve 252, to obtain a difference (NB) in the synchronized rotational speed.

Figure 6:
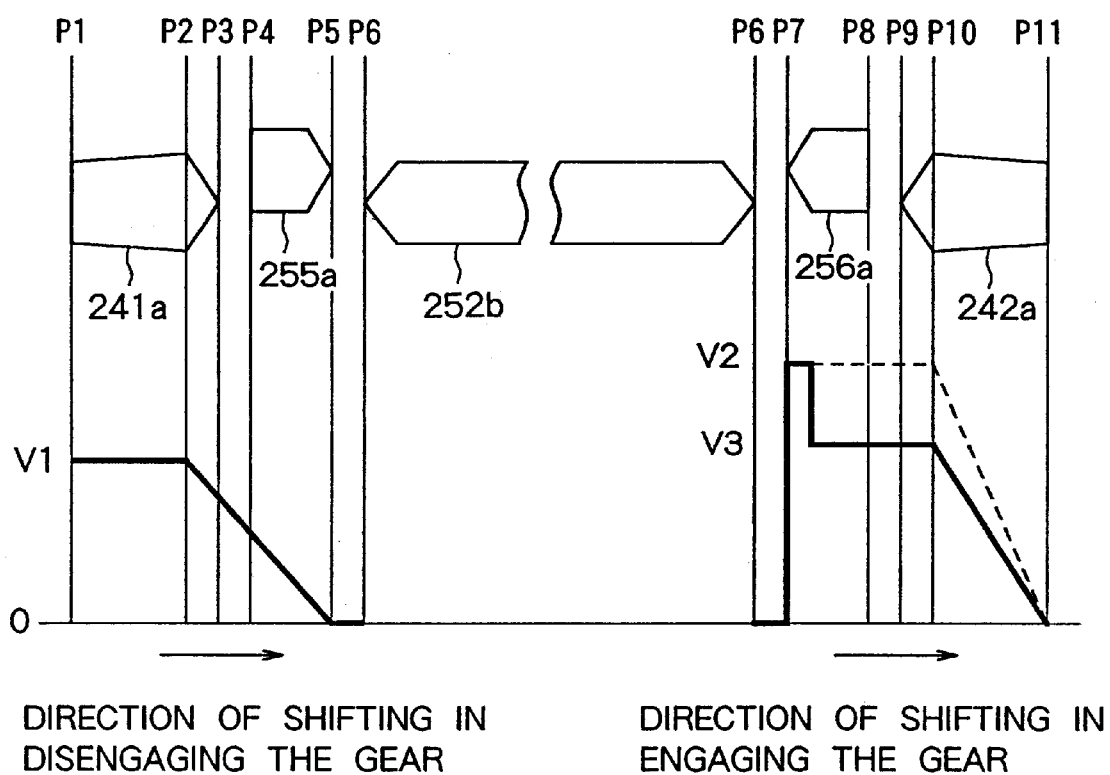
FIG. 6 is a diagram illustrating the relationship between the shift stroke position of the clutch sleeve in the synchronizing mechanism shown in FIG. 1 and the voltage applied to an electric motor in the shift-assisting device.

Next, the assisting force corresponding to the shift stroke position will be described with reference to FIG. 6. FIG. 6 illustrates a positional relationship among the spline 252b of the clutch sleeve 252, the teeth 255a of the synchronizer ring 255 for the fifth speed gear 241 and dog teeth 241a, the teeth 256a of the synchronizer ring 256 for the fourth speed gear 242 and dog teeth 242a in the neutral state. In the embodiment show in FIG. 6, a shift stroke position of the clutch sleeve 252 in its neutral state is designated at P6. P5 denotes a shift stroke position of the clutch sleeve 252 that is moved from the neutral state toward the fifth speed gear 241 side (toward the left in FIG. 6) and arrives at the front end of the chamfer of the teeth 255a of the synchronizer ring 255 for the fifth speed gear 241, P4 denotes a shift stroke position of the clutch sleeve 252 that arrives at the rear end of the teeth 255a of the synchronizer ring 255, P3 denotes a shift stroke position of the clutch sleeve 252 that arrives at the front end of the chamfer of the dog teeth 241a for the fifth speed gear 241, P2 denotes a shift stroke position of the clutch sleeve 252 that arrives at the rear end of the chamfer of the dog teeth 241a, and P1 denotes a shift stroke position of the clutch sleeve 252 that arrives at the rear end of the dog teeth 241a. Further, P7 denotes a shift stroke position of the clutch sleeve 252 that is moved from the neutral state toward the fourth speed gear 242 (toward the right in FIG. 6) and arrives at the front end of the chamfer of the teeth 256a of the synchronizer ring 256 for the fourth speed gear 242, P8 denotes a shift stroke position of the clutch sleeve 252 that arrives at the rear end of the teeth 256a of the synchronizer ring 256, P9 denotes a shift stroke position of the clutch sleeve 252 that arrives at the front end of the chamfer of the dog teeth 242a for the fourth speed gear 242, P10 denotes a shift stroke position of the clutch sleeve 252 that arrives at the rear end of the chamfer of the dog teeth 242a, and P11 denotes a shift stroke position of the clutch sleeve 252 that arrives at the rear end of the dog teeth 242a. The shift stroke positions are detected by the shift stroke sensor 85 (SIS). In the illustrated embodiment, the shift stroke sensor 85 (SIS) is so constituted as to produce a voltage signal of the smallest value when the shift strike position is P1, to produce the output voltage that gradually increases as the shift stroke position goes to the P11 side, and produces a voltage signal of the greatest value when the shift stroke position is P11.

In shifting the clutch sleeve 252 from the neutral state shown in FIG. 6 toward either the fourth speed gear 242 side or the fifth speed gear 241 side (in engaging the gears), the greatest operation force acts on the speed-change over 3 in the synchronizing range of from the shift stroke positions P7 or P5, i.e., from the positions at which the synchronizing action starts up to the shift stroke position P8 or P4 at which the synchronizing action ends. During the gear-engaging operation, therefore, the electric motor 81 (M1) may be driven in at least the synchronizing range to assist the shifting operation. During the gear-engaging operation, further, a relatively large force, which is smaller than that of in the above-mentioned synchronizing range, acts on the speed-change gear 3 in the engaging range of from the shift stroke position P9 or P3 to the shift stroke position P10 or P2, i.e., in a range where the chamfer of the spline 252b of the clutch sleeve 252 engages with the chamfer of the dog teeth 242a or 241a. During the gear-engaging operation, therefore, it is desired to assist the shifting operation by driving the electric motor 81 (M1) even during the period in which the dog teeth engage with the chamfer of the clutch sleeve. When the clutch sleeve 252 returns to the neutral state from a state of being engaged with the fourth speed gear 242 or the fifth speed gear 241, i.e., from the shift stroke position P11 or P1, further, a relatively large force acts on the speed-change gear 3 during a period until the spline 252b of the clutch sleeve 252 passes through the shift stroke position P10 or P2, i.e., passes through the rear end of the chamfer of the dog teeth. At the time of gear-disengaging operation, therefore, the shifting operation may be assisted by driving the electric motor 81 (M1) during the shift stroke of from the gear-engaged state until the rear end of the chamfer of the dog teeth is passed (in the range at which the dog teeth are in mesh with the clutch sleeve 252).

The assisting force during the gear-disengaging operation may be smaller than the assisting force during the gear-engaging operation. The assisting force is controlled by controlling the voltage or the current fed to the electric motor 81 (M1). The rotational direction in which the electric motor 81 (M1) is driven is, for example, the forward rotation when the clutch sleeve 252 is operated toward the left in FIG. 6 (when the first switch 41 (SW1) of the shift knob switch 4 is turned on) and is, for example, the reverse rotation when the clutch sleeve 252 is operated toward the right in FIG. 6 (when the second switch 42 (SW2) of the shift knob switch 4 is turned on). When, for example, the state where the gear is engaged with the fifth speed gear 241 is to be shifted down to the fourth speed, the electric motor 81 (M1) is reversely driven with a voltage V1 from P1 to P2, i.e., until the spline 252b of the clutch sleeve 252 passes over the rear end of the chamfer of the dog teeth 241a (during a period in which the dog teeth are in mesh with the clutch sleeve 252) as shown in FIG. 6. Then, the voltage is gradually lowered from P2 to P5 to halt the operation of the electric motor 81 (M1). When the clutch sleeve 252 arrives at P7 at which the synchronizing action starts from the neutral position P6, the electric motor 81 (M1) is reversely driven with a voltage V2 higher than the above voltage V1. In an example represented by a broken line in FIG. 6, the reverse rotation is maintained with the voltage V2 for a period until the spline 252b of the clutch sleeve 252 passes P10 that corresponds to the rear end of the chamfer of the dog teeth 242a. After the clutch sleeve 252 has passed P10, the voltage applied to the electric motor 81 (M1) is gradually lowered, and the driving of the electric motor 81 (M1) is brought to a halt at the shift stroke position P11.

As described above, when the electric motor 81 (M1) is driven with the voltage V2 in the period of synchronizing operation in engaging the gears and in the period in which the chamfer of the spline 252b of the clutch sleeve 252 engages with the dog teeth 242a or with the chamfer of the dog teeth 241a, a large assisting force is produced after the synchronization. Accordingly, the clutch sleeve 252 is moved at a high speed right after termination of the synchronization resulting in the occurrence of the phenomenon in which the clutch sleeve 252 hits the stroke end at a high speed. In the illustrated embodiment for solving this problem, the voltage applied to the electric motor 81 (M1) is lowered to V3 when the difference in the synchronized rotational speed has become smaller than a predetermined difference of rotational speed in the synchronized range as indicated by a solid line in FIG. 6. The voltage V3 is smaller than the voltage V2 and may be nearly the same as the voltage V1. The electric motor 81 (M1) is driven with the voltage V3 until the clutch sleeve 252 reaches P10.

Figure 7:
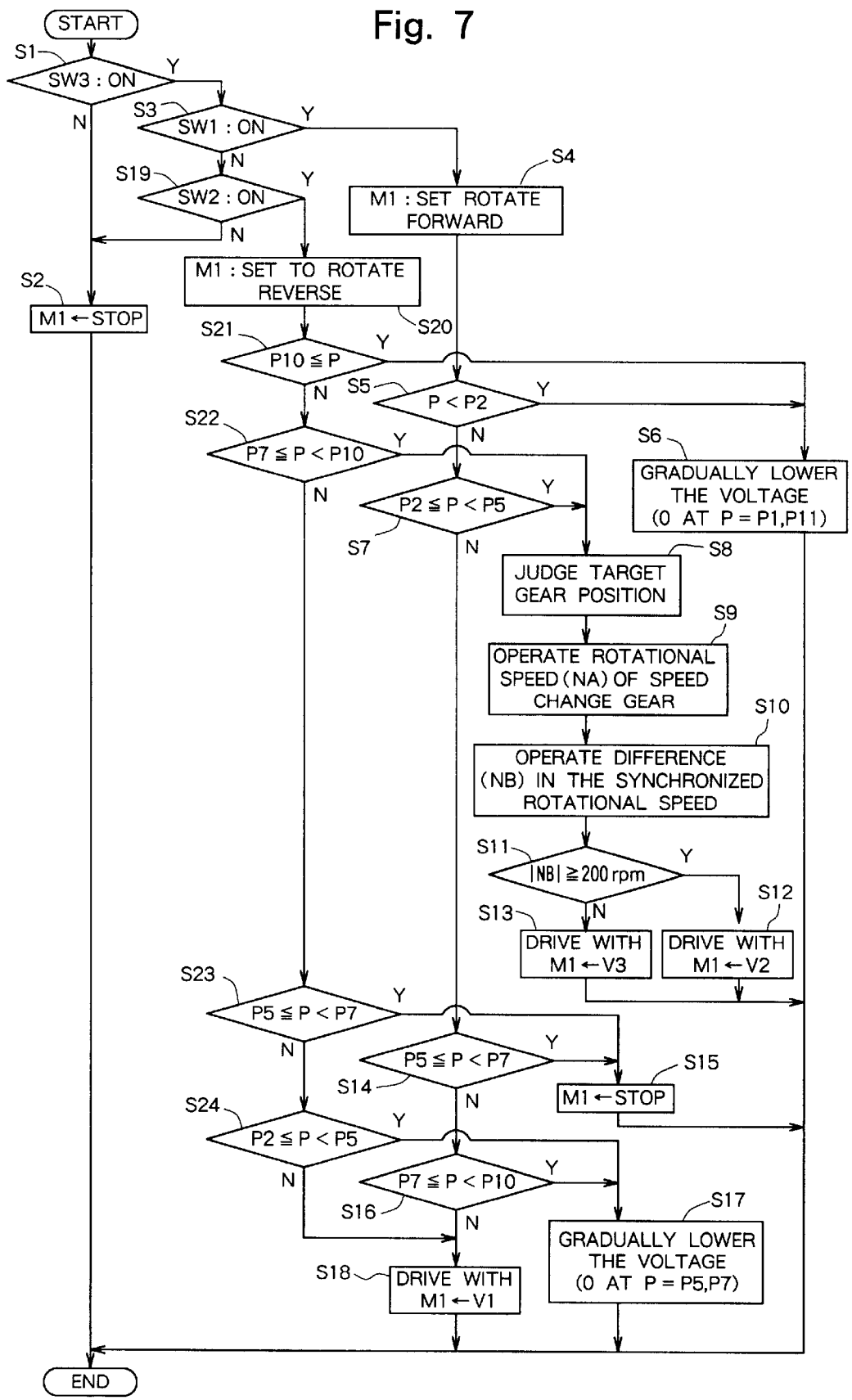
FIG. 7 is a flowchart illustrating a procedure of the shift-assist control operation of a controller that constitutes the shift-assisting device for the transmission, constituted according to the present invention.

Next, the operation of the controller 10 for assisting the shifting operation in the speed-change operation will be described with reference to the flowchart shown in FIG. 7.

First, the controller 10 checks whether the clutch pedal switch 91 (SW3) has been turned on, i.e., whether the clutch pedal 9 has been depressed to disconnect the clutch step S1). When the automatic clutch is mounted, it is checked whether the amount of engagement of the clutch is rather on the disconnected position side than the party-connected state of the clutch based on a signal from the clutch stroke sensor that detects the amount of engagement of the clutch. When the clutch pedal switch 91 (SW3) has not been turned on at step S1, the controller 10 judges that the drive is not willing to change the speed since the clutch has not been disconnected, and the routine proceeds to step S2 to end the operation by bringing the electric motor 81 (M1) to a halt.

When the clutch pedal switch 91 (SW3) has been turned on at step S1, the controller 10 judges that the clutch has been disconnected and the driver is willing to change the speed, and the routine proceeds to step S3 where it is checked whether the first switch 41 (SW1) of the shift knob switch 4 has been turned on, i.e., whether the operation has started to change the speed toward the first gear position, third gear position or fifth gear position. When the first switch 41 (SW1) has been turned on at step S3, the controller 10 proceeds to step S4 to set the electric motor 81 (M1) to turn forward and then, proceeds to step S5 where it is checked whether the shift stroke position P detected by the shift stroke sensor 85 (SIS) is smaller than P2, i.e., whether the clutch sleeve 252 is on the gear-engaging side rather than the rear end of the chamfer of the dog teeth 241a. When the shift stroke position P is smaller than P2 at step S5, the controller 10 judges that the clutch sleeve 252 is on the gear-engaging side rather than the rear end of the chamfer of the dog teeth 241a and there is no need of assisting the shift. The routine then proceeds to step S6 where the voltage applied to the electric motor 81 (M1) is gradually decreased, and the voltage is nullified (0) after the shift stroke position P has reached P1. The operation then ends.

When the shift stroke position P is larger than P2 at step S5, the controller 10 proceeds to step S7 and checks whether the shift stroke position P is larger than P2 but is smaller than P5, i.e., whether the clutch sleeve 252 is in the range of from a position of starting the synchronization up to a position where the dog teeth engage with the chamfer. When the shift stroke position P is larger than P2 but is smaller than P5 at step S7, the controller 10 judges that the clutch sleeve 252 is in the range of from the position of starting the synchronization to the position where the dog teeth are engaged with the chamfer, and that the shifting must be assisted during the gear-engaging operation. The routine therefore proceeds to step S8 where the target gear position shifted by the change lever 3 of the transmission 2 is judged. The target gear position is judged based on a selected position signal from the selected position sensor 75 (SES) and on the shifting direction signals from the first switch 41 (SW1) and the second switch 42 (SW2) constituting the shift knob switch 4, as described above.

After the target gear position is judged at step S8, the controller 10 proceeds to step S9 and determines the rotational speed (NA) of the speed change gear of the target gear position judged by the gear position judging means based on the target gear position that has been judged and on the rotational speed (Nin) of the input shaft detected by the input-shaft-rotational-speed sensor 27 (ISS). The rotational speed of the speed change gear is obtained by reading the gear ratio of the target gear position judged by the gear position judging means from the read-only memory (ROM) 102, and multiplying this gear ratio by the rotational speed (Nin) of the input shaft detected by the input-shaft-rotational-speed sensor 27 (ISS), as described above.

Next, the controller 10 proceeds to step S10 and determines the difference (NB) in the synchronized rotational speed. The difference (NB) in the synchronizing rotational speed is obtained by subtracting the rotational speed (Nout) of the output shaft detected by the output-shaft-rotational-speed sensor 28 (OSS) from the rotational speed (NA) of the speed change gear.

After the difference (NB) in the synchronized rotational speed is obtained at step S10, the controller 10 proceeds to step S11 and checks whether the absolute value of the difference (NB) in the synchronized rotational speed is larger than a predetermined rotational speed, e.g., 200 rpm. When the absolute value of the difference (NB) in the synchronized rotational speed is larger than 200 rpm at step S11, it means that the difference in the synchronized rotational speed is large. Therefore, the controller 10 proceeds to step S12 and drives the electric motor 81 (Mi) with the voltage V2. When the absolute value of the difference (NB) in the synchronized rotational speed is smaller than 200 rpm at step S11, it is judged that the synchronizing action is near to the completion, and the routine proceeds to step S13 and drives the electric motor 81 (M1) with the voltage V3. When the absolute value of the difference (NB) in the synchronized rotational speed is smaller than 200 rpm as described above, the electric motor 81 (M1) is driven with the voltage V3 which is lower than the voltage V2 and hence, an assisting force produced by the electric motor 81 (M1) after the synchronization decreases. This prevents the occurrence of the phenomenon in which the clutch sleeve 252 hits the stroke end at a high speed in the shifting operation.

When the shift stroke position P is larger than P2 but is not smaller than P6 at step S7, the controller 10 proceeds to step S14 and checks whether the shift stroke position P is larger than P5 but is smaller than P7, i.e., whether the clutch sleeve 252 is positioned between the two synchronizer rings 255 and 256. When the shift stroke position P is larger than P5 but is smaller than P7 at step S14, the controller 10 judges that the clutch sleeve 252 is positioned between the two synchronizer rings 255 and 256, and that there is no need to assist the shifting operation. The routine, then, proceeds to step S15 where the electric motor 81 (M1) is brought to a halt. The operation then ends.

When the shift stroke position P is larger than P5 but is not smaller than P7 at step S14, the controller 10 proceeds to step S16 and checks whether the shift stroke position P is larger than P7 but is smaller than P10, i.e., judges whether the clutch sleeve 252 is disengaged from the dog teeth 242a and the gear-disengaging operation has been completed. When the shift stroke position P is larger than P7 but is smaller than P10 at step S16, the controller 10 judges that the clutch sleeve 252 is disengaged from the dog teeth 242a and the gear-disengaging operation is completed. The routine, then, proceeds to step S17 where the voltage applied to the electric motor 81 (M1) is gradually decreased and the voltage is nullified (0) after the shift stroke position P has reached P7. The operation then ends.

When the shift stroke position P is larger than P7 but is not smaller than P10 at step S16, the controller 10 judges that the clutch sleeve 252 is in mesh with the dog teeth 242a and that the shifting operation must be assisted during the gear-disengaging operation. The routine, therefore, proceeds to step S18 where the electric motor 81 (M1) is driven with the voltage V1.

Next, described below is a case where the first switch 41 (SW1) of the shift knob switch 4 has not been turned on at step S3.

When the first switch 41 (SW1) of the shift knob switch 4 has not been turned on at step S3, the controller proceeds to step S19 and checks whether the second switch 42 (SW2) is turned on, i.e., whether the operation has started to change the speed toward the second gear position, fourth gear position or reverse gear position. When the second switch 42 (SW2) has not been turned on at step S19, the controller 10 judges that the driver is not willing to change the speed, and the routine proceeds to step S2 to end the operation by bringing the electric motor 81 (M1) to a halt.

When the second switch 42 (SW2) has been turned on at step S19, the controller 10 proceeds to step S20 to set the electric motor 81 (M1) to rotate in the reverse direction, and further proceeds to step S21 and checks whether the shift stroke position P detected by the shift stroke sensor 85 (SS) is larger than P10, i.e., whether the clutch sleeve 252 is on the gear-engaging side rather than the rear end of the chamfer of the dog teeth 242a. When the shift stroke position P is larger than P10 at step S21, the controller 10 judges that the clutch sleeve 252 is on the gear-engaging side rather than the rear end of the chamfer of the dog teeth 242a and that there is no need to assist the shifting. The routine then proceeds to step S6 where the voltage applied to the electric motor 81 (M1) is gradually decreased, and the voltage is nullified (0) after the shift stroke position P has reached P11. The operation then ends.

When the shift stroke position P is smaller than P10 at step S21, the controller 10 proceeds to step S22 and checks whether the shift stroke position P is larger than P7 but is smaller than P10, i.e., whether the clutch sleeve 252 is in a range of from a position for starting the synchronization to a position where the dog teeth engage with the chamfer. When the shift stroke position P is larger than P7 but is smaller than P10 at step S22, the controller 10 judges that the clutch sleeve 252 is in the range of from the position for starting the synchronization to the position where the dog teeth engage with the chamfer and that the shifting must be assisted during the gear-engaging operation. Therefore, steps S8 through S13 are executed.

When the shift stroke position P is larger than P7 but is not smaller than P10 at step S22, the controller 10 proceeds to step S23 and checks whether the shift stroke position P is larger than P5 but is smaller than P7, i.e., whether the clutch sleeve 252 is positioned between the two synchronizer rings 255 and 256. When the shift stroke position P is larger than P5 but is smaller than P7 at step S23, the controller 10 judges that the clutch sleeve 252 is positioned between the two synchronizer rings 255 and 256 and that there is no need to assist the shifting operation. The routine, then, proceeds to step S15 where the electric motor 81 (M1) is brought into a halt. The operation then ends.

When the shift stroke position P is larger than P5 but is not smaller than P7 at step S23, the controller 10 proceeds to step S24 and checks whether the shift stroke position P is larger than P2 but is smaller than P5, i.e., whether the clutch sleeve 252 is disengaged from the dog teeth 241a and the gear-disengaging operation has been completed. When the shift stroke position P is larger than P2 but is smaller than P5 at step S24, the controller 10 judges that the clutch sleeve 252 is disengaged from the dog teeth 241a and that the gear-disengaging operation has been finished. The routine, then, proceeds to step S17 where the voltage applied to the electric motor 81 (M1) is gradually decreased, and the voltage is nullified (0) after the shift stroke position P has reached P5. The operation then ends.

When the shift stroke position P is larger than P2 but is not smaller than P5 at step S24, the controller 10 judges that the clutch sleeve 252 is in mesh with the dog teeth 241a and that the shifting must be assisted during the gear-disengaging operation. Therefore, the routine proceeds to step S18 where the electric motor 81 (M1) is driven with the voltage V1.

The shift-assisting device for a transmission according to the present invention is constituted as described above, and exhibits actions and effects as described below.

That is, according to the present invention, in the shift-assisting device for a transmission equipped with a controller that outputs a signal of a driving force corresponding to the shift stroke position to an electric motor for shift-assisting, a signal of a driving force smaller than the driving force corresponding to the shift stroke position is constituted to output to the electric motor when the difference in the synchronized rotational speed is smaller than a predetermined rotational speed, so that the electric motor produces a decreased assisting force after the synchronization. This enables the shift-assisting device to prevent the occurrence of a phenomenon in which the clutch sleeve hits the stroke end at a high speed in the shifting operation and to eliminate the problem of the shift-assisting device that controls the electric motor for shift-assisting so as to produce a driving force that corresponds to the shift stroke position.

What I claim is:

1. A shift-assisting device for a transmission having a change-lever, said shift-assisting device comprising a speed-change operation mechanism; an electric motor for operating said speed-change operation mechanism in the same direction as the direction in which the change lever is shifted, said speed-change operation mechanism being adapted to be coupled to the change lever and adapted to actuate a synchronizing mechanism of the transmission; a shift stroke sensor for detecting the shift stroke position of said speed-change operation mechanism, and a controller for outputting to said electric motor a signal of a driving force corresponding to the shift stroke position detected by said shift stroke sensor; wherein said controller comprises a gear position judging means for judging a target gear position of the transmission, and a difference-in-the synchronized-rotational-speed detector means for detecting a difference in the synchronized rotational speed of the target gear position judged by said gear position judging means; and said controller is responsive to the difference in the synchronized rotational speed detected by said difference-in-the-synchronized-rotational-speed detector means being smaller than a predetermined rotational speed, to output said electric motor a signal of a driving force smaller than the driving force that corresponds to the shift stroke position.

2. A shift-assisting device for a transmission according to claim 1, further comprising a selected position sensor for detecting the selected position of said speed-change operation mechanism; and a shifting direction detector means for outputting signals corresponding to the operating in a first shifting direction and in a second shifting direction of the change lever; wherein said gear position judging means judges a target gear position of the transmission, that is to be shifted by the change lever based on the selected position detected by said selected position sensor and the shifting direction detected by said shift direction detector means.

3. A shift-assisting device for a transmission according to claim 1, further comprising an input-shaft-rotational-speed sensor for detecting the rotational speed of the input shaft of the transmission; and an output-shaft-rotational-speed sensor for detecting the rotational speed of the output shaft of the transmission; wherein said difference-in-the synchronized-rotational-speed detector means determines the rotational speed of a speed change gear of the target gear position judged by said gear position judging means based on the target gear position judged by said gear position judging means and the rotational speed of the input shaft detected by said input-shaft-rotational-speed sensor, and obtains a difference in the synchronized rotational speed by comparing the rotational speed of said speed change gear with the rotational speed of the output shaft detected by said output-shaft-rotational-speed sensor.

* * * * *